(12) United States Patent
Peroz et al.

(10) Patent No.: US 8,331,026 B2
(45) Date of Patent: Dec. 11, 2012

(54) PROCESS FOR SURFACE STRUCTURING OF PRODUCT HAVING A SOL-GEL LAYER, PRODUCT HAVING A STRUCTURED SOL-GEL LAYER

(75) Inventors: Christophe Peroz, San Francisco, CA (US); Elin Sondergard, Bourg la Reine (FR); Etienne Barthel, Bourg la Reine (FR)

(73) Assignee: Saint-Gobain Glass France, Courbevoie (FR)

( * ) Notice: Subject to any disclaimer, the term of this patent is extended or adjusted under 35 U.S.C. 154(b) by 511 days.

(21) Appl. No.: 12/594,734

(22) PCT Filed: Apr. 3, 2008

(86) PCT No.: PCT/FR2008/050594
§ 371 (c)(1),
(2), (4) Date: Mar. 1, 2010

(87) PCT Pub. No.: WO2008/142322
PCT Pub. Date: Nov. 27, 2008

(65) Prior Publication Data
US 2010/0177384 A1  Jul. 15, 2010

(30) Foreign Application Priority Data
Apr. 4, 2007  (FR) .................................... 07 54281

(51) Int. Cl.
*G02B 5/18* (2006.01)
*G02B 27/44* (2006.01)
*B29C 49/00* (2006.01)
*B28B 11/08* (2006.01)
*B29C 59/00* (2006.01)

(52) U.S. Cl. .......... 359/566; 264/284; 264/293
(58) Field of Classification Search ............... 264/319, 264/320, 322, 284, 293; 427/385.5; 359/566
See application file for complete search history.

(56) References Cited

U.S. PATENT DOCUMENTS
4,810,547 A   3/1989 Minami et al.
(Continued)

FOREIGN PATENT DOCUMENTS
EP   1 016 637 A2   7/2000
(Continued)

OTHER PUBLICATIONS
Herbert Krug, et al. "Fine patterning of thin sol-gel films." Journal of Non-Crystalline Solids 147 & 148, 1992. pp. 447-450.

*Primary Examiner* — Stephone Allen
*Assistant Examiner* — Kimberly N Kakalec
(74) *Attorney, Agent, or Firm* — Oblon, Spivak, McClelland, Maier & Neustadt, L.L.P.

(57) ABSTRACT

The present invention relates to a process for surface structuring, that is to say, for meaning forming at least one array of patterns with a submillimeter scale characteristic lateral dimension on a flat surface of a product comprising a substrate bearing at least one layer resulting from a sol-gel process, where the structuring is done hot with a hydrolyzed sol layer based on alkoxides and/or halide(s) of at least one metal chosen among Si, Ti, Zr, W, Sb, Hf, Ta, V, Mg, Al, Mn, Co, Ni, Sn, Zn, and Ce with a nonreactive organic group, where the structuring is carried out by contact with a structured mask and exerting pressure as needed, and where the structuring is carried out in a temperature range suited for a sufficient condensation threshold ensuring the thermal hold of the structuring, with a total structuring time less than or equal to two hours. The invention also covers the resulting product.

21 Claims, 5 Drawing Sheets

U.S. PATENT DOCUMENTS

| | | |
|---|---|---|
| 5,766,680 A | 6/1998 | Schmidt et al. |
| 6,258,305 B1 * | 7/2001 | Brinker et al. ................ 264/101 |
| 6,749,905 B1 | 6/2004 | Breitung et al. |
| 2006/0147677 A1 * | 7/2006 | Miyata et al. ................ 428/166 |

FOREIGN PATENT DOCUMENTS

| | | |
|---|---|---|
| EP | 1 025 988 A1 | 8/2000 |
| WO | WO 2007/060353 | 5/2007 |

* cited by examiner

PROCESS FOR SURFACE STRUCTURING OF PRODUCT HAVING A SOL-GEL LAYER, PRODUCT HAVING A STRUCTURED SOL-GEL LAYER

The present invention relates to the field of surface structuring and in particular targets a process for surface structuring of a sol-gel layer product and a structured sol-gel layer product thus obtained.

There is considerable interest in structuring of materials because it has applications in many technological fields.

The creation of an array of geometric patterns makes it possible to give a material a new and original function without changing the bulk composition and bulk properties thereof.

The inscription of a periodically replicated pattern has thus already been implemented for glass products (directly on the glass substrate or on a coating) for millimeter scale patterns, or even for patterns of the order of a tenth of a millimeter, in particular by rolling, laser engraving, or even etching techniques.

For patterns with smaller characteristic dimensions, in particular a micron or submicron scale width or period, the large majority of structuring techniques are lithographic techniques (optical lithography, electron beam lithography, etc.), used in microelectronics, for (small) integrated optical components.

They are however not suited to processes for mass production of products for one or more of the following reasons:
 their high cost;
 their slowness (scanning) and the complexity (multiple steps);
 limitation of the size of the patterns (by wavelength); and
 the small size of the structurable surfaces A more recent alternative technology, commonly called embossing, is used for transferring a base pattern, to be periodically replicated, from a mold to a soft layer placed on a glass substrate.

This layer is structured by lowering a flat pressing die bearing the pattern to be replicated, where the pattern is fixed by applying UV or heat.

The soft layer is typically a layer prepared by the sol-gel process starting from inorganic precursors.

This process is used to manufacture components for telecommunications companies or, in any other field, glass with hydrophilic layers. There are many advantages to this technique compared to the lithographic processes.

In terms of cost, the same pressing die can be reused very many times and, starting from a single model, gives rise to a large number of replicas.

In terms of throughput, this is a single-step process unlike other lithographic techniques which require steps for developing the patterns.

This known technique of embossing using a flat pressing die is however not yet satisfactory in terms of yield and reliability, in particular for micron or nanometer scale patterns.

Thus the subject of the present invention is a process for manufacturing a product having a structured sol layer which is durable and quick to manufacture and is so for any size of surface and pattern size.

This process also aims to expand the range of available products having a structured sol-gel layer, and in particular aims to obtain new geometries for new functionalities and/or applications.

For this purpose, the invention first proposes a process for surface structuring, that is to say for forming at least one array of patterns with a submillimeter scale characteristic lateral dimension on a flat surface of a product comprising a substrate bearing at least one layer resulting from a sol-gel process, where the structuring is done hot with a hydrolyzed sol layer based on alkoxide(s) and/or halide(s) of at least one metal chosen from Si, Ti, Zr, W, Sb, Hf, Ta, V, Mg, Al, Mn, Co, Ni, Sn, Zn, and Ce with a nonreactive organic group, where the structuring is carried out by contact with a structured mask and exerting pressure as needed, where the structuring is carried out in a temperature range suited for a sufficient condensation threshold ensuring the thermal hold of the structuring, with a total structuring time less than or equal to two hours, preferably less than or equal to one hour, and more preferably still less than or equal to 30 minutes.

The applicant has observed that a pattern array embossed when cold, or even at a temperature above ambient, fades or even disappears when it is subsequently subjected to heat, typically starting at 80° C.

Against all expectations the applicant has observed that this collapse of the patterns can be eliminated if the condensation rate after the structuring is sufficient. To obtain a sufficient condensation, it is possible to choose a very long structuring time, typically of the order of at least around 10 hours or even a day, to the detriment of the productivity.

Now, the applicant observed that the structuring time could be significantly lowered without losing the array of patterns. The structuring time will become shorter as the structuring is done at higher temperatures.

And, for limiting the energy costs and/or deformation of the selected polymer mask, a structuring temperature less than or equal to 200° C., even 180° C., is also preferable.

The heating can be done by an infrared or halogen lamp, or a heated fluid. The assistance (thermal, radiative, etc.) can be maintained during a part of the contact phase or can be cut off or even reversed (cooling, etc.) in order to stiffen the product.

For greater simplicity, a single setpoint temperature, and for example a (single) structuring hold can be selected.

The structuring begins starting at the time when a mold presses into the layer, and ends with the withdrawal of the hot mold or after the temperature of a mold remaining on the layer has decreased.

Additionally, by controlling the condensation rate in this way, the array of patterns is sufficiently stiff before the separation thereof from the mask that it does not lose the structuring during demolding. The hold during demolding is possible however for a lower condensation rate than that required for thermal stability.

The structuring process according to the invention can be easily automated and combined with other transformations of the product.

The process is suitable for manufacturing products in large volume and/or on a large scale, in particular glass products for electronics, optics, buildings or automobiles, in particular glazing units.

The structuring process according to the invention also makes it possible to attain still smaller characteristic pattern sizes on larger and larger surfaces with an acceptable tolerance for texturing defects, that is to say those which do not degrade the performance being sought.

The structuring can be carried out on large substrates—flexible, semi-rigid or rigid, organic, mineral or hybrid substrates—in particular preferably glass and/or transparent substrates.

The structuring can be carried out by simple capillary filling of a structured flexible mask, or else by viscoelastic deformation by contact with a structured mask and while exerting pressure.

Advantageously the structuring can be done on a product whose surface area is greater than or equal to 0.1 m², or even more preferably greater than or equal to 5 m². In particular, the product width can be greater than or equal to 1 m.

In a first embodiment, the structuring is carried out in part at a temperature at least between 100° C. and 130° C. preferably for a time between 10 minutes and 30 minutes.

In a second embodiment, the structuring is carried out in part at a temperature at least between 130° C. and 200° C. for a time of less than 20 minutes, and more preferably between 150° C. and 180° C. and preferably for a time of less than or equal to 10 minutes, even less than or equal to 5 minutes.

Advantageously, the characteristic lateral dimension of the pattern, otherwise referred to as its width, can be less than 50 µm, preferably 10 µm, and more preferably still micron or submicron size. Many chemical elements can be the basis for the sol-gel layer. It may include as essential constituent material at least one compound of at least one of the elements: Si, Ti, Zr, W, Sb, Hf, Ta, V, Mg, Al, Mn, Co, Ni, Sn, Zn, and Ce. It may in particular involve a single or mixed oxide of at least one of the aforementioned elements.

Organic or inorganic or hybrid compounds (colorants, photochromic compounds, inorganic or hybrid nanoparticles) can be encapsulated in the sol-gel matrix.

The group may be aromatic, vinyl or phenyl.

Zirconium or silicon can preferably be chosen as metal; the sol is preferably chosen among a silicon or zirconium alkoxide with an organic group, in particular aromatic, vinyl or phenyl group, particularly a methyltriethoxysilane (MTEOS).

MTEOS is an organosilane which has three hydrolyzable groups and whose organic part is a methyl. It makes it possible to achieve layers that are thin (for example a few hundred nanometers) or thick (for example a few microns). The synthesis of the sol based on this compound is extremely simple because it is done in a single step and does not require any heating. Further, the prepared sol is stable and can be stored for several days without gelling.

The layer can be essentially silica-based, in particular for its adhesion and compatibility with the glass element.

The layer to be structured can be filled with metallic particles.

This layer can preferably be transparent and have an optical index for example greater than that of glass (typically about 1.5).

As an indication, at 600 nm, a silica layer typically has a refractive index of the order of 1.45, a titanium oxide layer has a refractive index of the order of 2 and a zirconium layer has a refractive index of the order of 1.7.

The sol-gel layer may be dense or be (meso)porous, in particular by means of a pore-forming agent, especially a surfactant (organic).

Thus, this structurable layer can preferably be transparent and/or can have other characteristics or functionalities: hydrophobic, hydrophilic, low or high index, electrically conducting, semiconducting or dielectric.

Preferably the thickness of the layer to be structured can be between 50 nm and 50 µm, and more preferably between 100 nm and 12 µm.

The more quickly the structuring is done after the deposition, the better the result in particular for sols-gels which develop over time.

It is also possible to provide a step for depositing said layer carried out on the structuring line.

The preferred processes for depositing the layers are spin coating, dip coating, or spraying of the sol then spreading the drops by raking or brushing or even by heating as described in particular in the article entitled "*Thermowetting embossing of the organic-inorganic hybrid materials*", W-S. Kim, K-S. Kim, Y-C. Kim, B-S Bae, 2005, *Thin Solid Films*, 476 (1), 181-184. The process selected can also be coating by going through a spinner (spin-coating).

Advantageously, the process includes a thermal treatment step at a treatment temperature sufficient for eliminating the organic group(s), in particular above 500° C. and preferably 700° C. A structured inorganic layer, without cracks and with good retention of initial dimensions and good mechanical hold can thus be obtained. For example it is a silica layer.

Preferably the mask can be heated after placement in contact with the layer for enhancing the impression.

The pressure can be below 5 bar, preferably below bar, in particular when the mask is flexible, preferably based on a polymer material.

As polymer material, an elastomer can be cited particularly made of PDMS (polydimethylsiloxane) or VDMS (vinyldimethylsiloxane); mask can be surface treated with TMCS (trichloromethylsiloxane).

These masks have the advantage of complying with the surface of the substrate, which minimizes the pressure required for establishing a contact with the layer to be structured.

The structuring can be carried out with a flat mask, in particular using a flat pressing die or be done using a curved mask and/or a mask associated with a rotating means (cylinder, etc.).

During the structuring of the layer, the stiff selected substrate can preferably (mineral or organic) remain stiff, where the surface thereof is thus not made structurable.

It can be a rigid substrate. A rigid substrate means one which, under normal temperature and pressure conditions, has a modulus of at least 60 GPa for a mineral element, and at least 4 GPa for an organic element.

It can be a glass or silicon substrate. Glass substrate means both a mineral (soda-lime-silica, borosilicate, vitreous ceramic, etc.) glass and an organic glass (for example a thermoplastic polymer such as a polyurethane or a polycarbonate).

The glass substrate is preferably transparent having in particular an overall light transmission of at least 70 to 75%.

Concerning the composition of the glass substrate, it is preferable to use a glass having a linear absorption less than 0.01 mm$^{-1}$ in the part of the spectrum useful to the application, generally the spectrum from 380 to 1200 nm.

It is still more preferable to use an extra-clear glass, which means a glass having a linear absorption less than 0.008 mm$^{-1}$ in the wavelength spectrum ranging from 380 to 1200 nm. For example the Diamant brand glass sold by Saint-Gobain Glass can be chosen.

The glass substrate can be monolithic, laminated or bicomponent. After structuring, the product can also undergo various glass processing operations: tempering, shaping, laminating, etc.

The glass substrate can be thin, for example of the order of 0.1 mm for mineral glasses or 1 mm for organic glasses, or thicker for example of thickness greater than or equal to a few millimeters or even centimeters.

The mask pattern is not necessarily the negative of the replicated pattern. Thus the final pattern can be formed with several masks or by several passes.

The mask can have several zones with patterns which are distinguished by their size (width and height) and/or their orientation and/or their distance.

According to the intended structuring shape and/or intended applications, this process might not necessarily lead to perfect geometric shapes. In particular, in the case of patterns with sharp angles, the pattern can be rounded without degrading the required performance.

The surface of the layer and/or the mask can advantageously include a surfactant-type anti-adhesion agent.

For this purpose, a fluorinated silane layer can be grafted on the surface of the mask or of the substrate before use, as described in the publication entitled "Improved anti-adhesive coating for nanoimprint lithography" by S. Park, J. Gobrecht, C. Padeste, H. Schift, K. Vogelsang, B. Schnyder, U. Pieles, S. Saxer, Paul Sherrer Institut scientific reports, 2003. This layer preferably does not exceed a thickness of a few nanometers, and therefore does not risk modifying the patterns, even of submicron scale dimension, by filling in the cavities of the mask. The anti-adhesive layer thus formed also makes it possible to use the mask several times.

The structuring can be carried out on a multilayer preferably comprising an upper seed layer, preferably that is electrically conducting for a subsequent electrolytic deposit.

The patterns can be hollows and/or in relief, be elongated, in particular parallel to each other and/or at a constantly maintained distance (corrugated, zigzag, etc.) The patterns can also be inclined.

The structuring forms for example an array of studs, in particular prismatic studs, and/or an array of elongated patterns, in particular with a cross section which is rectangular, triangular, trapezoidal, etc.

The structure can be periodic, pseudo-periodic, quasi-periodic or random.

The elongated patterns can have bends for example in the shape of H, Y or L in particular for a microfluidic application.

The surface of the layer can be structured several times, preferably continuously, using masks which can be similar or different, for example with decreasing pattern size.

Additionally, a pattern itself can be structured.

For example, the structured surface is hydrophobic, the pattern has a rectangular cross section and is structured by rectangular (sub)patterns for enhancing the hydrophobic nature.

Both main surfaces of said product can be structured with similar or different patterns, simultaneously or successively.

The process can also include a step of depositing an additional layer on the structured surface followed by at least one new structuring operation.

The process is preferably carried out in a clean atmosphere (clean room, etc.).

In one embodiment, where the mask is organized by structuring domain having different patterns (that differ because of their shape, because of one of their characteristic dimensions, in particular the pitch p) and/or different orientations of patterns, the flat surface is structured by structuring domain.

In particular several (identical or different) small-size sub-masks can be used to form a large-size mask. This makes manufacturing thereof easier and gives more flexibility (changing one of the masks if necessary in case of wear, defects, etc.).

A step of depositing a conducting, semiconducting and/or hydrophobic layer, in particular an oxide-based layer, can follow the structuring or a first structuring. Preferably this deposition is carried out continuously. For example, the layer is metallic, made of silver or aluminum. Advantageously it is possible to provide a step of selectively depositing a conducting layer (in particular a metallic, oxide-based layer) on the structured surface, on or between patterns, for example dielectric or less conducting patterns.

This layer, for example metallic layer, in particular silver or nickel layer, can be deposited electrolytically. To form an electrode for electrolysis in this latter case, the structured layer can advantageously be a (semi)conducting layer or a dielectric layer of sol-gel type filled with metallic particles or even a multilayer with a conducting upper seed layer. The chemical potential of the electrolytic mixture is adapted to make deposition in the areas of high curvature preferential.

After structuring of the layer, a transfer of the pattern array to the substrate and/or to an underlying layer, in particular by physical or chemical etching, can be considered. The structured layer may be a sacrificial layer, which could be partially or totally eliminated.

The invention also covers a glass product resulting from the process as previously described.

This glass product has all the aforementioned advantages (durability and homogeneity of the pattern, etc.).

The characteristic dimension, in particular the width of the pattern, is preferably of micron or submicron scale, and preferably the array extends over a surface area at least greater than or equal to 0.1 $m^2$, and more preferably still greater than or equal to 0.5 $m^2$.

The structured glass product can be intended for an electronic, construction or automobile application, for a microfluidic application with bent channels whose width is between 1 and 800 μm and depth is between 0.1 and 500 μm.

In particular various products can be listed, especially glazing units:
  with modified ("super" hydrophobic or hydrophilical) chemical properties,
  optical products in particular for lighting or backlighting systems for LCD-type flat screens (reflective polarizer, element for redirecting light toward the front, etc.), in particular a light extraction means for an electroluminescent device, optical products for example intended for display screen, lighting or signboard applications, or a photonic structure,
  for buildings, in particular a solar and/or thermal control glazing including a diffraction grating that is diffracted in the infrared, with period p preferably between 200 and 1500 nm, or a glazing for redirection of natural light called "Daylighting" glazing including a grating that is diffractive or refractive in the visible, with period p preferably between 100 nm and 500 μm,
  for a solar cell.

The array can be three-dimensional or more specifically two-dimensional array, where one of the characteristic dimensions of the pattern is nearly invariant in a preferred direction of the surface.

The structure can be periodic, pseudo-periodic, quasi-periodic or random.

The surface opposite the flat surface can also be structured and/or covered with a functional layer.

The function and the properties associated with the structuring depend on the following characteristic dimensions:
  the height h of the pattern (maximum height in case of a plurality of heights) and the width w of the pattern (maximum width in case of a plurality of widths), in particular the ratio h over w;
  the distance (maximum distance in case of a plurality) d between patterns, and in particular the ratio w over d, or of the pitch p, meaning the sum w+d.
In the present invention, preferably:
  the distance d is between 10 nm and 500 μm;
  the width w is between 10 nm and 50 μm or the aspect ratio w over d is included between $2·10^{-5}$ and $5·10^4$;
  the ratio h over w is less than or equal to 5.
One, some or all of the characteristic dimensions can be preferably of micron scale or be submicron scale.

The structuring can induce physiochemical modifications, in particular of the surface energy.

The structuring can also induce a super hydrophobicity (lotus effect). For modifying the wetting, patterns with sizes ranging up to a micron are possible.

For optical purposes, the glass product can partially transmit light emitted from one source or a set of sources whose total extent is 100 cm$^2$.

The range of optical functionalities of the micro-structured or nano-structured products is broad.

Some applications will require "nano-" structured reliefs, of pitch p of the order of 100 nm, in particular below 400 nm, for the limiting diffractive effects (and retaining the transparency of the glass product).

For example, the desired structures are gratings of lines with periods ranging from 80 nm to 400 nm.

The array according to the invention can include a grating of dielectric (transparent) and conducting lines, whose pitch is less than the operating wavelength. The conductor can be a metal, in particular aluminum or silver for use in the visible spectrum domain. Then, the height of the dielectric grating (assumed to be in relief) and the height of the metal array are defined.

More array configurations are possible:
the dielectric grating is covered with a uniform metal layer ("double metal" grating and on the sides);
the metal grating is deposited on the dielectric grating patterns or between the patterns (the structure is said to be "raised").

The dielectric patterns can be of the same material as the substrate supporting all of the structure. The dielectric patterns can have an index less than that of the substrate.

A material whose index is less than that of the substrate can be placed between the substrate and the dielectric grating. The structure is called "ribbed".

If the pitch is clearly less than the operating wavelength, in particular visible wavelength, (for example half the wavelength) the grating operates as a reflective polarizer. The polarization s perpendicular to the plane of incidence (parallel to the metallic lines) is preferably over 90% reflected, whereas the polarization $\vec{p}$ (perpendicular to the lines and parallel to the plane of incidence) is preferably transmitted between 80-85%.

The reflective polarizer can be used in other wavelength ranges, in particular in the infrared.

A backlighting system which consists of a light source or "backlight" is used for example as a source of backlighting for liquid crystal display (LCD) screens.

The structured glass product according to the invention can also be a reflective polarizer for LCD screens.

The glass product according to the invention can also be a redirection element for the light emitted toward the front (towards its normal).

It can comprise on its structured surface a repetition of at least one pattern, in particular geometric pattern, where the patterns are distributed regularly or randomly, with width less than or equal to 50 µm and of which the absolute value of the slope is on average greater than or equal to 10°, still more preferably 20° or even 30°.

The pattern is chosen among at least one of the following patterns:
an elongated pattern, hollow or in relief, in particular a prism preferably with a apex angle substantially equal to 90° or microlens,
a three-dimensional pattern, hollow or in relief, in particular of pyramid type, with preferably a base of width less than or equal to 50 µm and a apex angle less than 140°, still more preferably less than 110°,
a Fresnel lens type pattern.

And, on the optically smooth opposite surface, this element for redirection of the light toward the front can be associated a rigid diffuser or include a single defusing layer (already described), or with a low index layer (already described) and with an external diffusing layer.

The structured layer can then preferably have a refractive index greater than that of the glass substrate. The patterns can be joined with a pitch between 0.5 and 50 µm preferably less than 5 µm.

The glass product according to the invention can also be associated with or integrated in at least one light-emitting device having an organic or inorganic electroluminescent layer, in particular of the OLED or PLED type, a TFEL device or a TDEL device.

In a known manner, some devices having electroluminescent layers comprise:
a glass substrate,
a first electrode and a second electrode on one and the same face of the substrate, where at least one of the two electrodes is transparent,
an electroluminescent system with at least one electroluminescent layer interposed between the first and second electrodes.

With an inorganic electroluminescent layer, this is referred to as a TFEL (Thin Film Electroluminescent). This system in general includes a layer called a phosphor layer and at least one dielectric layer. Examples of inorganic electroluminescent stacks are for example described in document U.S. Pat. No. 6,358,632.

The dielectric layer can be thick (a few microns). It is then referred to as a TDEL (Thick Dielectric Electroluminescent). TDEL implementation examples are given in the document EP 1,182,909.

With an organic electroluminescent layer, this is referred to as an OLED. OLEDs are generally separated into two major families according to the organic material used. If the organic electroluminescent layers are polymers, they are referred to as PLEDs (Polymer Light Emitting Diodes). If the electroluminescent layers are small molecules, they are referred to as SM-OLEDs (Small Molecule Organic Light Emitting Diodes). Some examples of organic electroluminescent stacks are for example described in document U.S. Pat. No. 6,645,645.

In an electroluminescent device, the two electrodes preferably have the form of electro-conductive layers The structuring participates in the extraction of light thus enabling an increase in the luminous efficiency.

In a first configuration, one seeks to block the trapping of light between the electrodes.

It is for example possible to choose to structure, by etching, the glass substrate covered with a sacrificial layer structured by the process according to the invention.

To reproduce the structuring, the lower electroconductive layer (single or multiple layer), the electroluminescent system and the upper electroconductive layer are then directly deposited. To avoid short circuits, the upper electroconductive layer (the farthest removed from the substrate) could be made planar.

It is also possible to deposit an additional layer and form a flat surface before depositing the lower electroconductive layer. Preferably, this additional layer can have a refractive index at least 0.1 greater than the index of the glass substrate, even at least 0.2, for example a zirconium layer, in particular of sol-gel type.

Alternatively it is possible to choose to use a glass substrate with a layer structured by the process according to the invention, for example a silica layer or a zirconium layer, in particular of sol-gel type.

The structured layer is topped either directly by the lower electroconductive layer or topped by an additional layer with a flat surface. Preferably, the layer topping the structured layer can have a refractive index at least 0.1 greater than the index of the structured layer, even at least 0.2, for example a layer of SiNx with index 1.95.

The structuring includes at least one periodic grating with lateral dimension w of submicron scale, pitch p between 150 nm and 700 nm, height h less than 1 μm, in particular between 20 and 200 nm. When the electroluminescent system is multichromatic, in particular forming white light, the structuring preferably includes a plurality of adjacent gratings, each of lateral dimension w of submicron scale, height h less than 1 μm, in particular between 20 and 200 nm, where these gratings have distinct pitches p between 150 nm and 700 nm in order to extract a plurality of wavelengths.

These patterns can for example be long lines, extending substantially from one edge of the substrate to the other, or short, of minimal length equal to 50 μm, or even other patterns with longitudinal section (parallel to the surface) which is circular, hexagonal, square, rectangular, oval and in particular have a transverse section which is (substantially) rectangular, semi-cylindrical, frustoconical, or pyramidal.

Examples of OLED devices with structured gratings are given in the articles entitled "Enhanced light extraction efficiciency from organic light emitting diodes by insertion of two dimensional photonic crystal structure" Y. Do et al, Journal of Applied Physics volume 96, n° 12, pp 7629-7636 or else "A high extraction-efficiency nanopatterned organic light emitting diode", Y. Lee et al, Applied Physics Letters, vol 82 n° 21, pp 3779-3781 herein incorporated by reference. These products are made with lithographic techniques on small surfaces.

In a second configuration, alternative to or cumulative with the first configuration, one seeks to prevent the trapping of light in the glass substrate.

To do this, it is possible for example to choose to structure, by etching, the glass substrate topped by a sacrificial layer structured by the process according to the invention on the surface of the glass substrate opposite the surface (capable of being) associated with an electroluminescent system for forming an electroluminescent device.

Alternatively it is possible to choose to use a glass substrate with a layer structured by the process according to the invention, for example a silica layer or zirconium layer, in particular of sol-gel type on the surface of the glass substrate opposite the surface (capable of being) associated with an electroluminescent system for forming an electroluminescent device.

Preferably, the patterns are of a material with a refractive index less than or equal to that of the glass substrate.

The array is periodic, the pattern has a micron scale lateral dimension w, in particular between 1 to 50 μm (typically around 10 μm), and the patterns are spaced by 0 to 10 μm.

These patterns, in particular geometric, can for example be long lines, extending substantially from one edge of the substrate to the other, or short, of minimum length equal to 50 μm, or even other patterns with longitudinal section (parallel to the surface) which is circular, hexagonal, square, rectangular, oval and in particular with a transverse section which is (substantially) rectangular, semi-cylindrical, frustoconical, or pyramidal (in hollow or in relief).

The patterns can be aligned or offset to form a hexagonal array.

An example of an OLED device with an array of microlenses is described in "Improved light-out coupling in organic light emitting diodes employing ordered microlens arrays" by S Moller et al, Journal of Applied Physics, vol 91 n° 5, pp 3324-3327 herein incorporated by reference. These products are made with lithographic techniques on small surfaces.

The glass product according to the invention can also be associated with a light emitting diode having point source(s) of electroluminescent device (LED) type. In this configuration, the diodes are set and/or bonded on a glass substrate with one or more arrays such as one described for the first and/or second configuration.

Other advantageous details and properties of the invention will appear upon reading the examples illustrated by the following figures.

Nanostructuring of thin sol-gel films from nanostructured flexible replication masks of PDMS (polydimethylsiloxane) is done by thermal impression.

Each PDMS replication mask is preferably reproduced simply by flowing liquid PDMS on structured masters of nickel or silicon. After solidification at 80° C. for two hours and separation, the PDMS replication mask is treated by chemical vapor deposition of TMCS (trichloromethylsiloxane) in order to develop an anti-adhesion surface.

The porous PDMS replication mask increases the sol-gel condensation kinetics with better solvent evaporation possible compared to hard silicon and nickel molds.

This replication mask has the advantage of respecting the surface of the substrate, which minimizes the pressure required for establishing contact with the substrate.

Two series of sol-gel films A and B were prepared from an MTEOS (methyltriethoxysilane) sol obtained under acidiferous conditions.

After complete hydrolysis of the ethoxy groups, the films—with a thickness between 300 nm and 1 μm—are spin coated on glass substrates.

The impression phase takes place at low pressure ($P_{imp}$<1.5 bar); the cavities are principally filled by capillarity. The low viscosity of MTEOS enhances the filling of the nanocavities of the mask and reduces the annealing constraints.

The mask is heated after placement in contact with the sol-gel layer. A maximum impression temperature Timp for a given time timp is set. The maximum temperatures and impression times during the hold for the series A and B are listed respectively in tables 1 and 2 below. The rise time up to Timp varies between one and four minutes.

TABLE 1

| Series A | $T_{imp}$ | $t_{imp}$ |
|---|---|---|
| A1 | 130° C. | 85 min |
| A2 | 110° C. | 30 min |
| A3 | 150° C. | 5 min |
| A4 | 170° C. | 3 min |
| A5 | 130° C. | 15 min |

TABLE 2

| Series B | T$_{imp}$ | t$_{imp}$ |
|---|---|---|
| B1 | 130° C. | 3 min |
| B2 | 110° C. | 3 min |
| B3 | 110° C. | 5 min |
| B4 | 110° C. | 10 min |
| B5 | 110° C. | 20 min |
| B6 | 150° C. | 2 min |

The faster the rise, the more the impression at temperature Timp can be shortened.

After gradual return to ambient temperature, the replication mask and the structured product are separated. The mask can also be withdrawn when hot, for example at 80° C.

Figure 1:
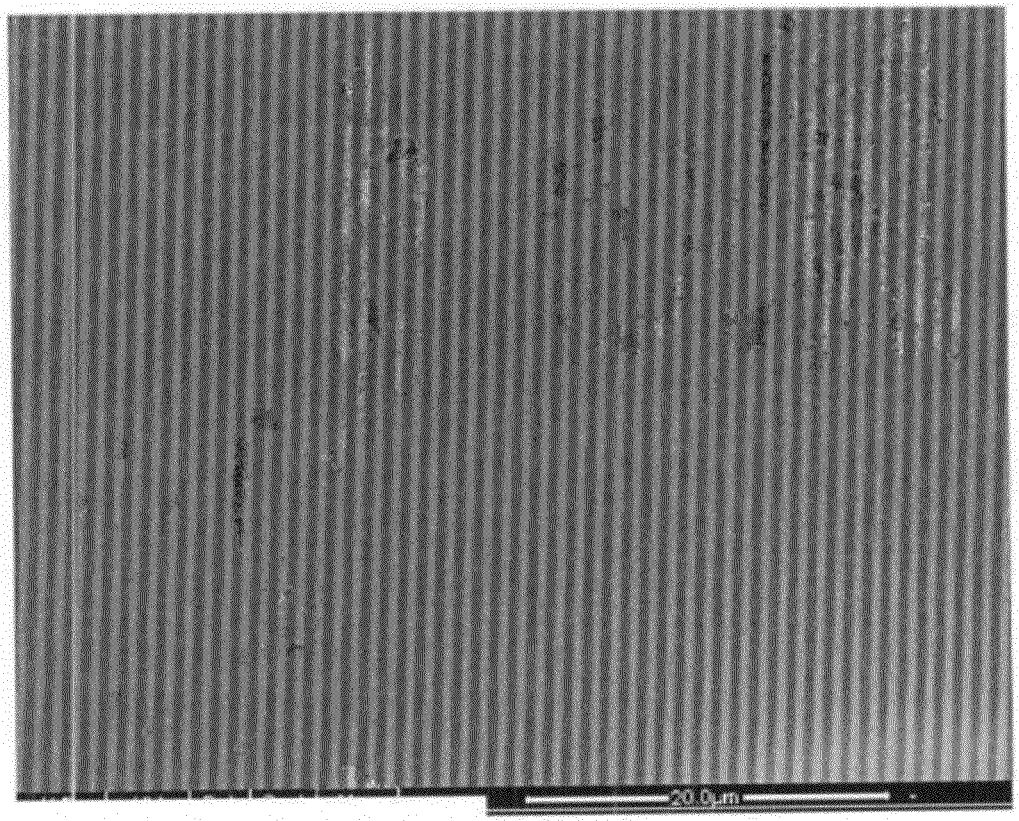
FIGS. 1 to 4 show SEM (scanning electron microscope) images of two products with nanopatterns before annealing.
Figure 2:
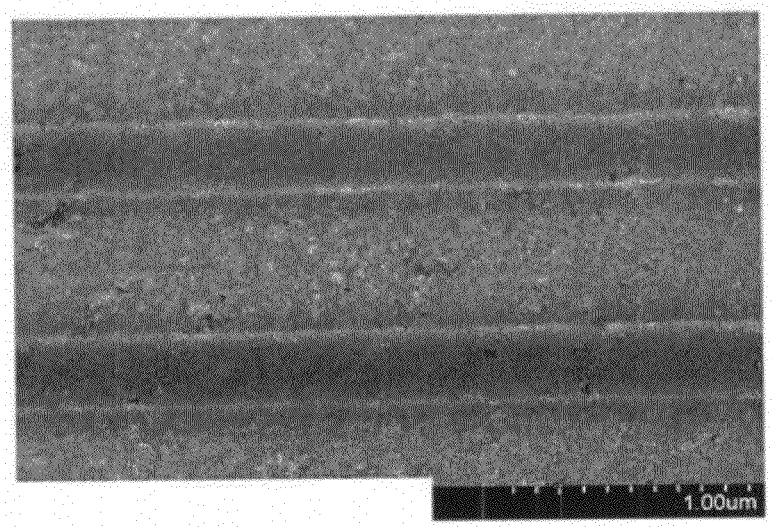
Figure 3:
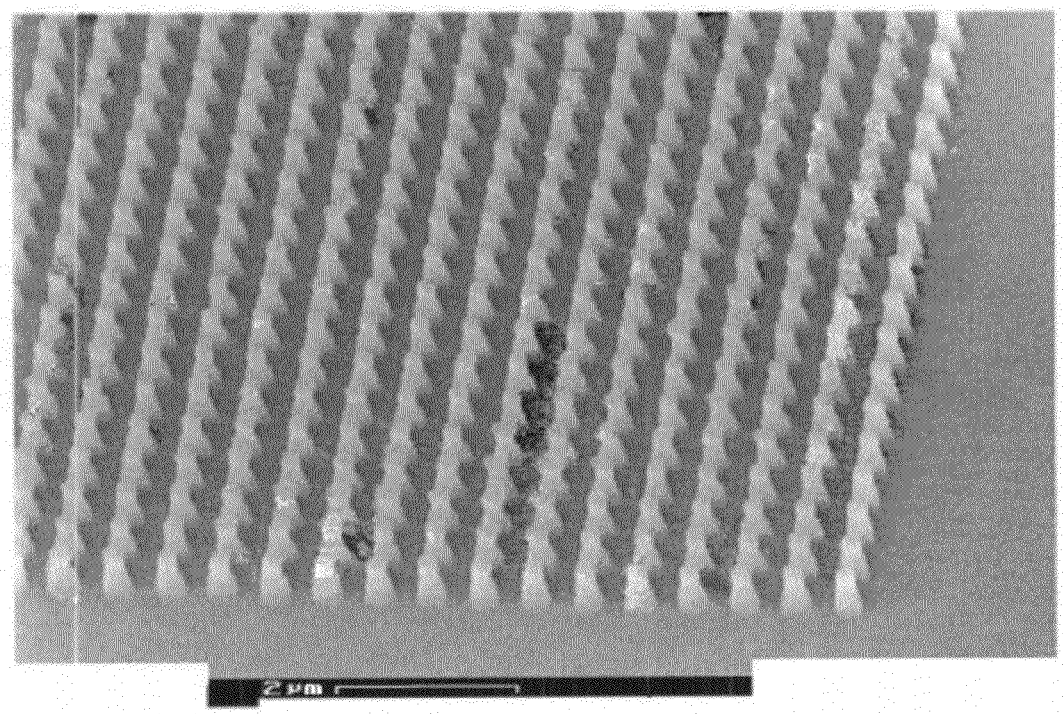
Figure 4:
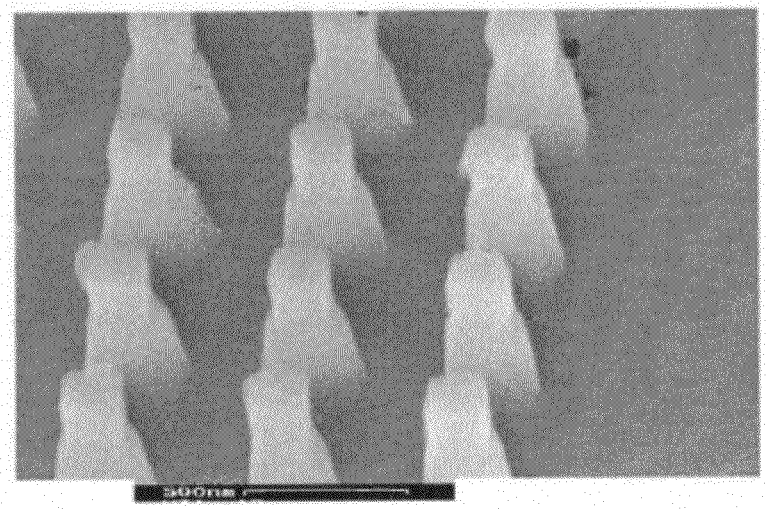

For each series A and B, different structurings were carried out:
An array of lines 340 nm wide and about 150 nm deep with a pitch of 1 μm, illustrated in FIGS. 1 and 2,
An array of studs about 160 nm in diameter and about 650 nm deep with a pitch of 600 nm, illustrated in FIGS. 3 and 4.

The elements are printed with good homogeneity over several square centimeters and conform to the initial sizes of the replication masks.

The annealing of the printed MTEOS films takes place in an external atmosphere furnace for densifying the array and obtaining the complete oxidation and decomposition of the methyl groups (CH$_3$). The thermal treatment takes place at about 500° C. for about two hours. Neither photolithographic equipment nor access to a clean room is needed.

Figure 5A:
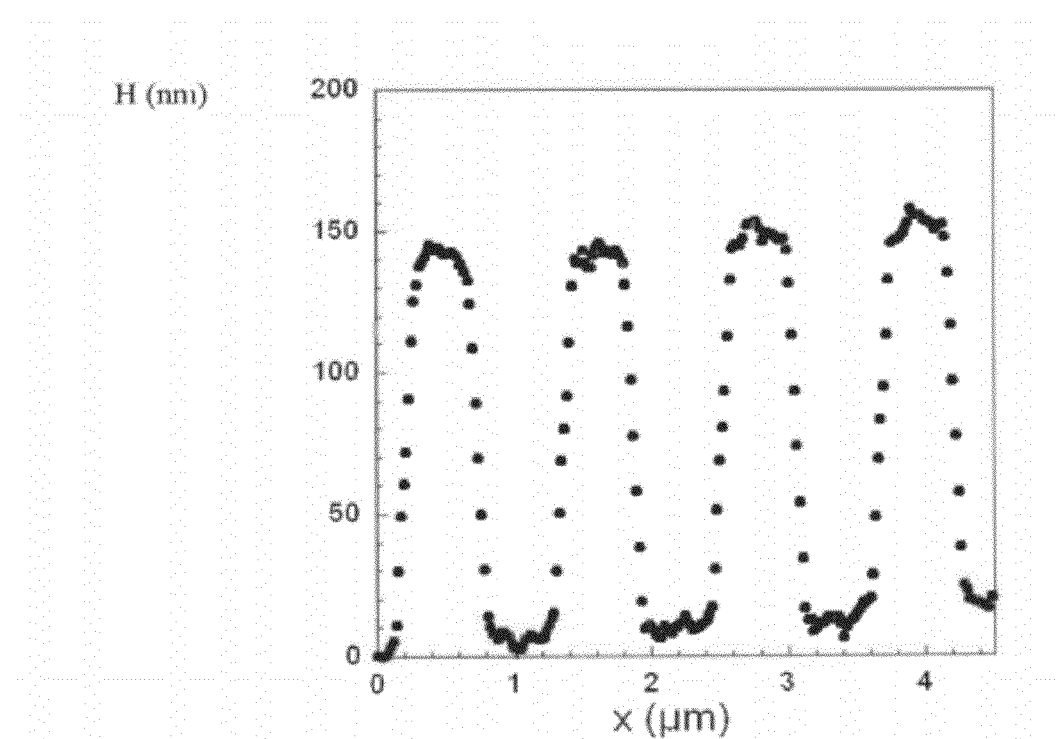
FIGS. 5a to 6b show respectively the structuring profiles of two resulting products with nanopatterns before and after annealing.
Figure 5B:
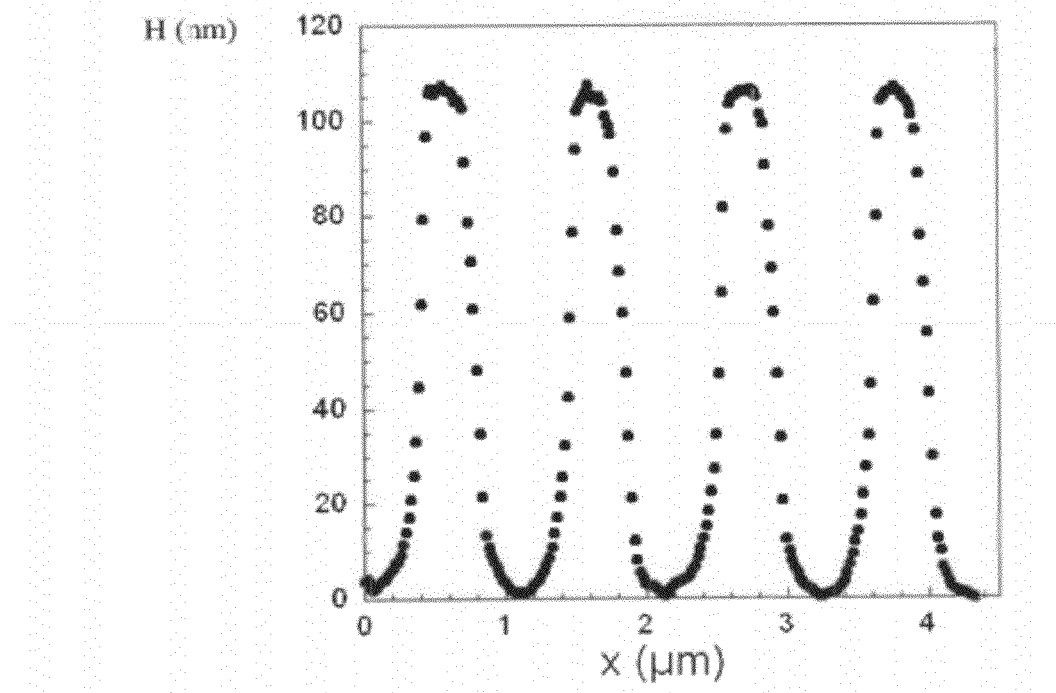

For the series A, the nanostructure properties are retained after annealing and a pure silica nanostructure coating is obtained. The FIGS. 5a and 5b respectively illustrate the structuring profiles of sample A1 before and after annealing respectively. The development of the height H as a function of the position x is obtained.

The initial elements can thus be retained without change of periodicity (1 μm for sample A1) and the silica glass nanostructures are free of cracks. It is observed that the shape of the trenches is smooth with the height of the patterns which lowers from 140 nm to 105 nm respectively before and after post-curing corresponding to a shrinking of size of about 25%. These results show here the capacity to anneal the patterns for burning the organic parts with a small shrinking of the elements.

The nanopatterns are stable over time, at least for three months, and are not degraded by conventional solvents.

The good mechanical hold of the structures is additionally confirmed by a series of abrasion tests with a felt pad; the test is known under the name of "OPEL" test.

Figure 6A:
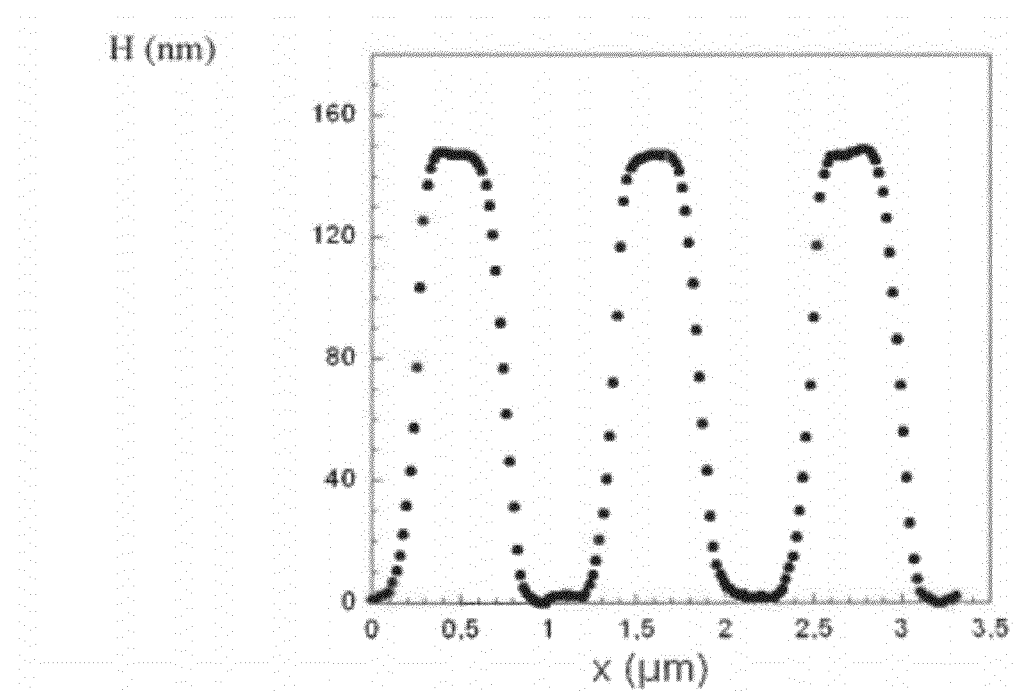
Figure 6B:
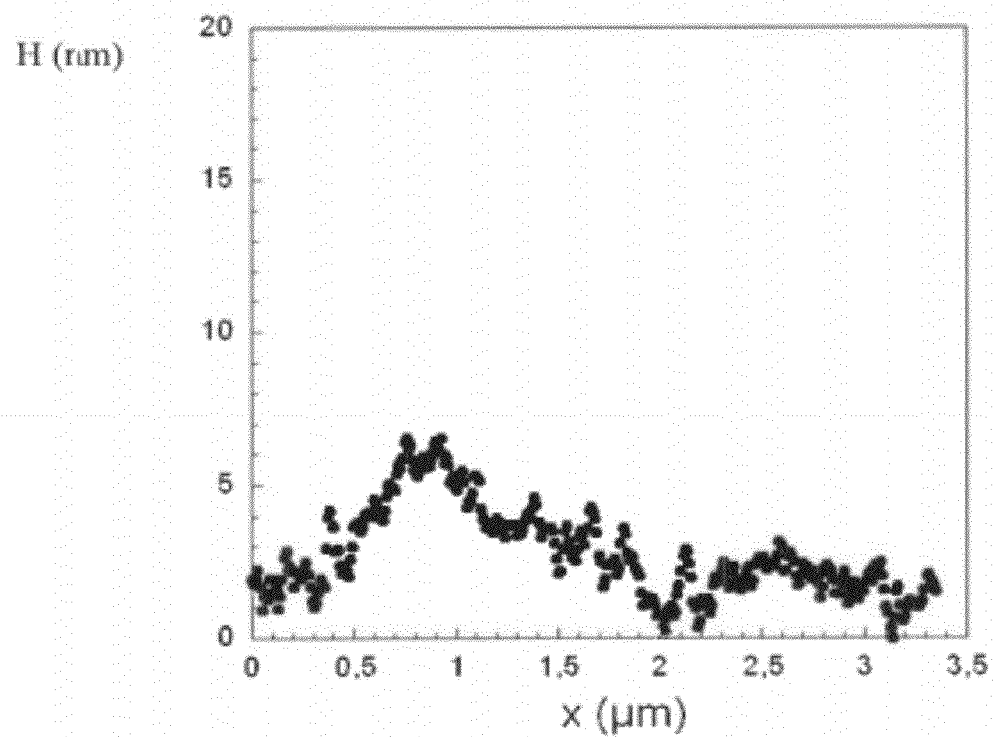

For the series B, the nanopatterns disappear after annealing. Such is the case, for example, for the sample B1 whose structuring profiles obtained before and after annealing are shown in FIGS. 6a and 6b.

In this case the pattern disappears after annealing because the film refluidizes during the heating phase.

The retention of the patterns depends on the condensation level of the film after impression. After a sufficient condensation level, the coating is sufficiently cross-linked to remain "solid" during the heating phase with annealing, whereas it refluidizes under the effect of the temperature if the condensation rate is too low.

This is confirmed by the observation of silanol condensation in the sol-gel films deposited on silicon wafers of two series A' and B'. These films are deposited optionally impressed, and annealed under conditions identical to series A and B.

The observation is made by FTIR (Fourier transform infrared) spectroscopy in normal incidence transmission mode. The condensation rate increases with the lowering of the Si—OH bond absorption peak at about 920 cm$^{-1}$ in an FTIR spectrum. Therefore the condensation of silanol groups in the film was tracked by monitoring the lowering of the silanol SiOH IR band at 920 cm$^{-1}$.

The importance of the degree of silanol SiOH condensation for the thermal stability of the nanopatterns is verified. For a sufficient condensation rate (series A'), a state of irreversible solidification is reached when the nanopatterns are thermally and chemically stable. For a low degree of condensation (meaning high Si—OH absorption peak), the structures (series B') disappear during a post-curing treatment because of the refluidization of the sol-gel films.

The condensation rate increases with temperature, therefore the higher the temperature, the lower the timp necessary to reach the condensation threshold.

Figure 7A:
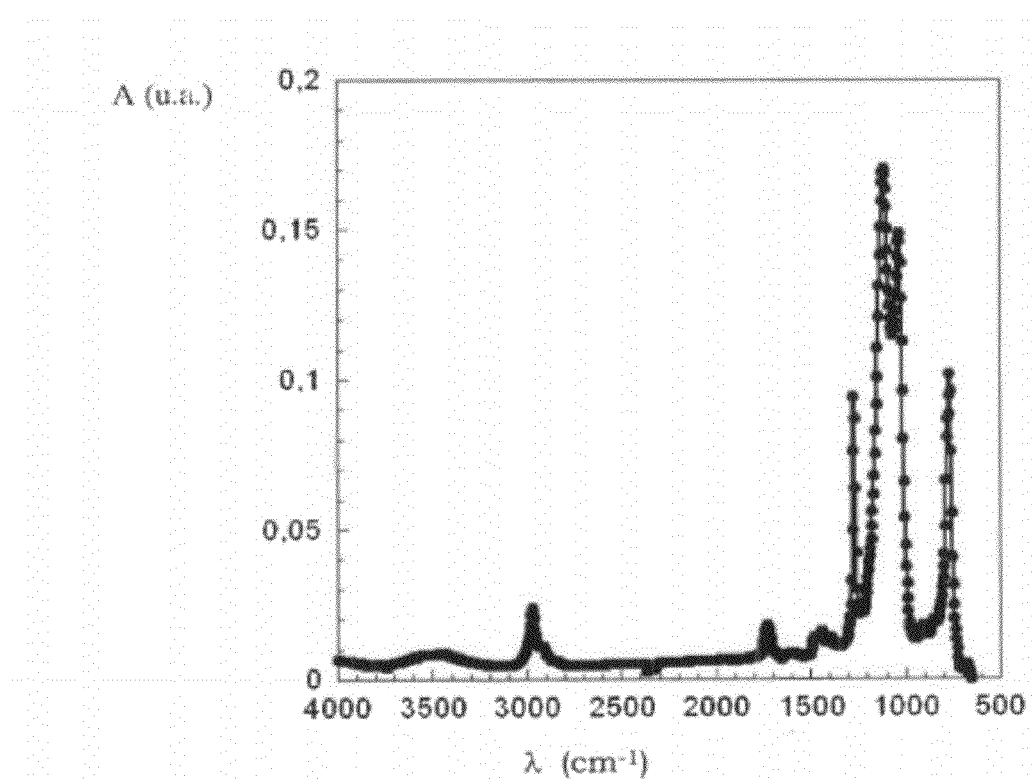
FIGS. 7a and 7b show the FTIR spectra of a product with nanopatterns before and after annealing.
Figure 7B:
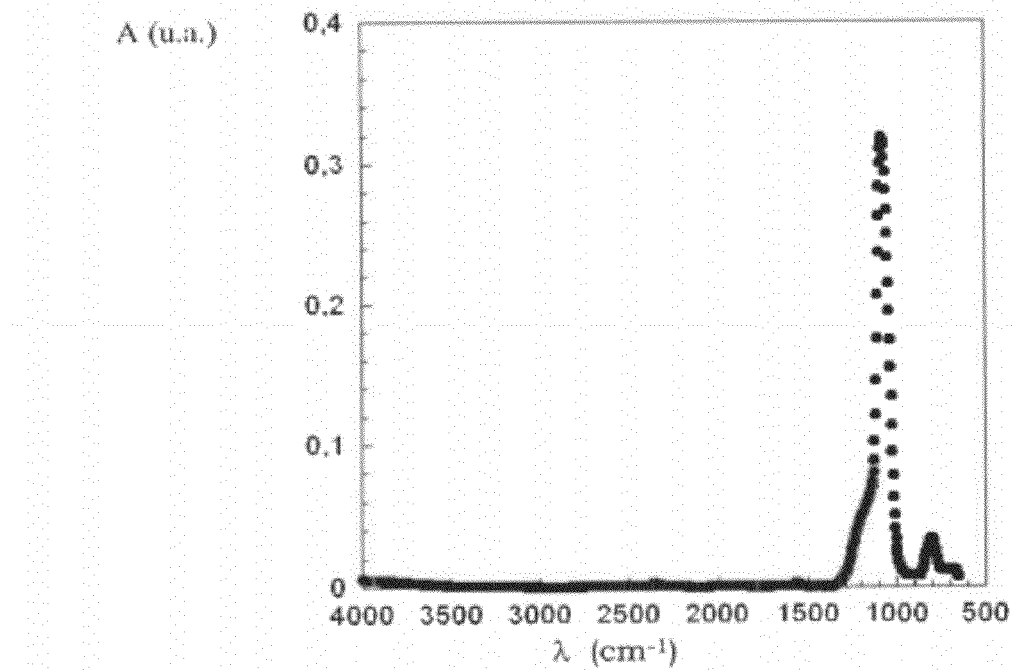

FIG. 7 compares the FTIR spectra for the sample A1' printed like the sample A1, spectra before and after annealing at 700° C. for two hours. The absorption A is measured as a function of the wavelength. The absorption peaks of the Si—CH$_3$ (1280 cm$^{-1}$) and C-H$_3$ (2950 cm$^{-1}$) bonds have disappeared, just like the silanol groups (920 cm$^{-1}$) after post-curing treatment. This confirms the obtaining of a pure silica nanostructured coating as shown by the presence of the SiO$_2$ absorption band.

Further, before the structuring, one or the other following steps can take place, preferably continuously:
The possible deposit of underlying layer(s),
and, even further upstream, forming of the selected glass substrate for example by the float process.

One or the other of the following steps can be carried out after the structuring preferably continuously:
a second structuring preferably by means of an analogous device placed downstream with reduced-dimension replication and/or different orientation(s) patterns;
a transfer of patterns to the substrate and/or to an underlying layer by etching;
with a glass substrate, one or more of the glass transformations: tempering, laminating, cutting, etc.

Depositing a metal layer, for example silver, on the structured surface can follow the structuring, preferably continuously.

This depositing can be selective, for example a metal layer is deposited on the summits of line patterns, for example to form an electrode for an electrolytic deposition.

As an example, a reflective polarizer is obtained that reflects in the visible by forming an array of metal lines with a pitch of 200 nm, a width at half-height of 80 nm, a distance at half-height of 120 nm, a dielectric height h of 180 nm, and a metal thickness of 100 nm.

A polarizer can be obtained in the infrared by increasing the dimensions.

The invention claimed is:

1. A process for surface structuring which comprises forming at least one array of patterns with a submillimeter scale characteristic lateral dimension on a flat surface of a product comprising a substrate bearing at least one layer resulting from a sol-gel, wherein the structuring is done hot with a hydrolyzed sol layer based on alkoxide(s) and/or halide(s) of at least one metal chosen from Si, Ti, Zr, W, Sb, Hf, Ta, V, Mg, Al, Mn, Co, Ni, Sn, Zn, and Ce having a nonreactive organic group, the structuring is carried out by contact with a structured mask and exerting pressure as needed, and the structuring is carried out in a temperature range suited for a sufficient condensation threshold ensuring the thermal hold of the structuring, with a total structuring time less than or equal to two hours.

2. The process for surface structuring as claimed in claim 1 wherein the total structuring time is less than or equal to one hour.

3. The process for surface structuring as claimed in claim 1 wherein the structuring is carried out in part at a temperature at least between 100° C. and 130° C. for a structuring time between 10 minutes and 30 minutes.

4. The process for surface structuring as claimed in claim 1 wherein the structuring is carried out in part at a temperature at least between 130° C. and 200° C. for a time of less than 20 minutes.

5. The process for surface structuring as claimed in claim 1 wherein the metal is zirconium or silicon, and the sol is chosen from among a silicon or zirconium alkoxide with an aromatic, vinyl or phenyl group.

6. The process for surface structuring as claimed in claim 1 wherein the layer is transparent and/or is dense or porous, and/or is filled with metal particles.

7. The process for surface structuring as claimed in claim 1 wherein it includes a subsequent thermal treatment at a treatment temperature sufficient for eliminating the organic group(s).

8. The process for surface structuring as claimed in claim 1 wherein the mask is heated after placement of the mask in contact with the layer.

9. The process for surface structuring as claimed in claim 1 wherein the pressure is below 5 bar, and the mask is based on a polymer material.

10. The process for surface structuring as claimed in claim 1 wherein the structuring is carried out with a flat mask.

11. The process for surface structuring as claimed in claim 1 wherein the surface of the layer and/or the mask includes a surfactant-type anti-adhesion agent.

12. The process for surface structuring as claimed in claim 1 wherein the structuring forms an array of prismatic studs, and/or an array of elongated patterns, where the patterns are optionally inclined.

13. The process for surface structuring as claimed in claim 1 wherein where the mask is organized by structuring domains each having different patterns and/or a different orientation of patterns, the flat surface is structured by a structuring domain.

14. The process for surface structuring as claimed in claim 1 wherein a transfer of the pattern array to the substrate and/or to a layer underlying the sol-gel layer is carried out, and the structured sol-gel layer could be eliminated.

15. A structured product comprising a substrate bearing a layer obtained by a sol-gel route and structured by the process as claimed in claim 1.

16. The structured product as claimed in claim 15 wherein the layer is made of silica.

17. The structured product as claimed in claim 15 wherein the substrate is made of glass or silicon.

18. The structured product as claimed in claim 15 wherein the characteristic lateral dimension is of micron or submicron scale, and the array extends over a surface area at least greater than or equal to 0.1.

19. The structured product as claimed in claim 15 wherein it is intended to be used in a solar and/or thermal control glazing of a building including a diffraction grating that diffracts in the infrared, a glazing for redirection of natural light, or to be used in automobiles or electronics, in a microfluidic application, a glazing with optical functionality, an element for redirection of light toward the front, a light extraction means for an electroluminescent device, or a hydrophobic or hydrophilic glazing, or a solar cell.

20. The structured product as claimed in claim 15 wherein it includes an array of elongated dielectric patterns and elongated metallic patterns adjacent to and/or superposed on the dielectric patterns, and/or in that it includes an array of geometric patterns, where the patterns are distributed regularly or randomly, with width less than or equal to 50 µm and of which the absolute value of the slope is on average greater than or equal to 10° to form an element intended to redirect light toward the front.

21. The structured product as claimed in claim 15 wherein it includes at least one periodic array with lateral dimension w of submicron scale, pitch p between 150 nm and 700 nm, and height h less than 1 µm, where the patterns have in particular a rectangular cross section, and said array could be in or on the surface of the glass substrate associated with an electroluminescent system for forming an electroluminescent device and/or in that it includes a periodic array with lateral dimension w of micron scale, and height h less than 50 where the patterns are aligned or offset to form a hexagonal array in or on the surface of the glass substrate opposite the surface associated with an electroluminescent system for forming an electroluminescent device.

\* \* \* \* \*